United States Patent
Eckert et al.

(10) Patent No.: US 9,333,928 B2
(45) Date of Patent: May 10, 2016

(54) MOTOR VEHICLE STRUCTURE WITH CRASH BOX

(71) Applicant: GM GLOBAL TECHNOLOGY OPERATIONS LLC, Detroit, MI (US)

(72) Inventors: Uwe Eckert, Bischofsheim (DE); Ronald Scheer, Trebur (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/444,735

(22) Filed: Jul. 28, 2014

(65) Prior Publication Data

US 2015/0028606 A1   Jan. 29, 2015

(30) Foreign Application Priority Data

Jul. 26, 2013   (DE) .................. 10 2013 012 479

(51) Int. Cl.
| | |
|---|---|
| *B60R 19/34* | (2006.01) |
| *B62D 65/16* | (2006.01) |
| *B62D 21/15* | (2006.01) |
| *B62D 25/08* | (2006.01) |
| *B60R 19/24* | (2006.01) |

(52) U.S. Cl.
CPC .............. B60R 19/34 (2013.01); B62D 21/152 (2013.01); B62D 25/082 (2013.01); B62D 65/16 (2013.01); *B60R 2019/247* (2013.01); *Y10T 29/49622* (2015.01)

(58) Field of Classification Search
CPC .... B62D 21/152; B62D 65/16; B62D 25/082; B60R 19/34; B60R 2019/247; Y10T 29/49622
See application file for complete search history.

(56) References Cited

U.S. PATENT DOCUMENTS 8,764,096 B2 *   7/2014   Han et al. ................. 296/133

FOREIGN PATENT DOCUMENTS

| DE | 19744274 A1 | 4/1999 |
|---|---|---|
| DE | 102010006975 A1 | 8/2011 |
| DE | 102010006977 A1 | 8/2011 |
| DE | 102010014999 A1 | 10/2011 |
| DE | 102010024572 A1 | 12/2011 |
| DE | 102012200410 A1 | 7/2013 |
| JP | 11048883 A | 2/1999 |
| JP | 2009248603 A | 10/2009 |
| WO | 2012157437 A1 | 11/2012 |

\* cited by examiner

*Primary Examiner* — Glenn Dayoan
*Assistant Examiner* — Melissa A Black
(74) *Attorney, Agent, or Firm* — Ingrassia Fisher & Lorenz PC

(57) ABSTRACT

A motor vehicle structure is disclosed which includes a cross member, at least one side member connected to the cross member via a crash box. At least one strut supports a lateral region of the cross member, and the strut is connected to a molded part which is connected to the crash box and/or the side member.

18 Claims, 2 Drawing Sheets

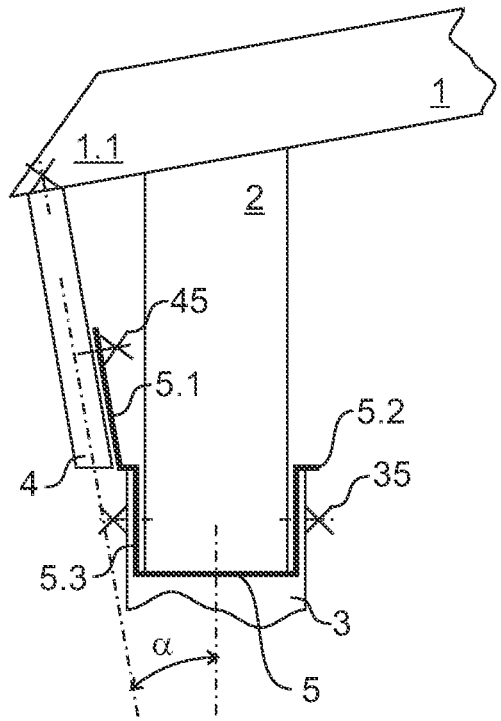
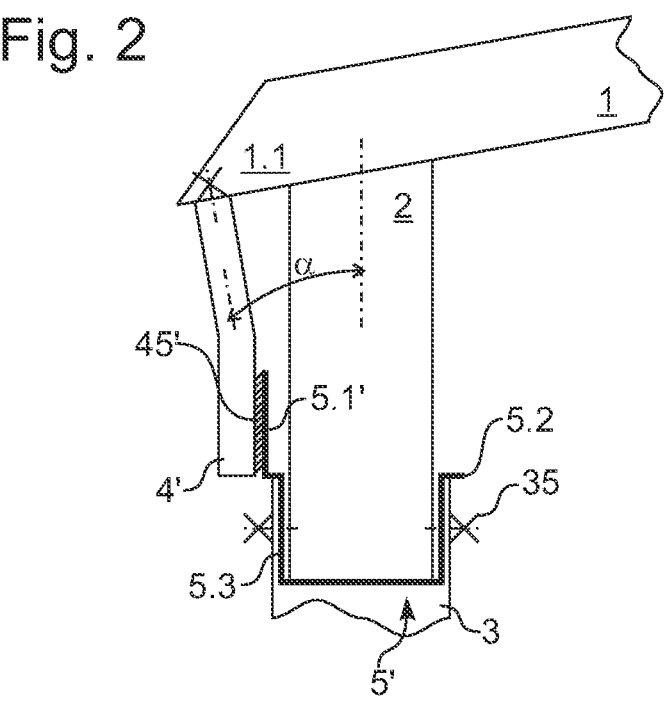

MOTOR VEHICLE STRUCTURE WITH CRASH BOX

CROSS REFERENCE TO RELATED APPLICATION

This application claims priority to German Patent Application No. 102013012479.4 filed Jul. 26, 2013, which is incorporated herein by reference in its entirety.

TECHNICAL FIELD

The technical field relates to a motor vehicle structure with a cross member, a side member connected to the cross member via a crash box, and a strut for supporting a lateral region of the cross member.

BACKGROUND

DE 10 2010 014 999 A1 describes a motor vehicle bumper arrangement with a cross member that is coupled to the side member via crash boxes. The end portions of the side members have V-shaped extensions, which are coupled to the crash box in a materially joined, non-positively or positively joined manner such that in the case of a head-on collision the coupling breaks away allowing the crash box to bend without further restricting its folding behavior in a head-on crash, contributes to increasing the lateral crash stiffness but in a lateral collision.

SUMMARY

The present disclosure provides a motor vehicle, in particular a passenger car with a motor vehicle structure having at least one, and preferably two crash boxes releasably connected to a cross member, and in particular to front or rear bumper cross member in a non-positively and/or positively joined manner. The crash boxes may be connected to the cross member by in a non-positively joined manner preferably through screwing and/or plugging and/or in a positively joined manner preferably through plugging and/or welding, soldering, bonding or riveting.

Each crash box is releasably connected to a side member. The crash boxes may be connected to the side member by in a non-positively joined manner preferably through screwing and/or plugging and/or in a positively joined manner preferably through plugging and/or welding, soldering, bonding or riveting. Through the crash boxes, impact energy, can be at least partially broken down into deformation work and the side member and/or vehicle occupants protected in this way in the case of a head-on collision. In an embodiment, the cross member includes at least one lateral region which in the vehicle transverse direction protrudes over an outer crash box towards the outside. In the case of a so-called offset head-on collision, these lateral regions are particularly affected.

According to an embodiment of the present disclosure, at least one strut for supporting a region is connected to the respective lateral region. In an embodiment, at least one strut has a closed cross section which may be solid or hollow, and preferably an annular cross section or the like. As a result, advantageous stability can be made available in an embodiment.

In an embodiment, the strut includes a longitudinal axis which is at least substantially straight. This longitudinal axis may include an angle with a longitudinal axis of an adjacent crash box, with a longitudinal axis of an adjacent side member and/or with a vehicle longitudinal axis which amounts to a maximum of about 45°, preferably a maximum of about 40°, and more preferably a maximum of about 35°.

In another further development, the strut can also include at least one straight portion or curved portion which is angled against one another. In this case, the curved and/or angled longitudinal axis of the strut includes an angle with the longitudinal axis of an adjacent crash box, with the longitudinal axis of an adjacent side member and/or with the vehicle longitudinal axis of a maximum of about 45°, preferably a maximum of about 40°, and more preferably a maximum of about 35°.

Through such an angle or a strut which is substantially parallel to the crash box, the side member and/or the vehicle longitudinal axis, the strut can advantageously support the lateral region and advantageously divert a load imposed by an offset head-on collision.

According to an aspect of the present disclosure, the strut is connected to a molded part, which in turn is connected to the crash box and/or the side member. Through this molded part, the assembly of the strut can be advantageously improved. Additionally or alternatively, the connection of the strut to the crash box or the side member can also be improved. Further additionally or alternatively, a deformation of the strut and/or of its connection to the crash box or the side member can be advantageously improved the event of a crash so that a desired deformation characteristic be made available. In particular, the shape, wall thickness, material and/or connection of the molded part are correspondingly predetermined or can be predetermined Thus, the molded part can include a strut flange, which is connected to a long side of the strut. As a result, a connection can be made which is parallel to a force flow in the strut and in particular in the case of a crash and/or laterally supports the strut. Additionally or alternatively, a strut flange of the molded part is connected to a front side of the strut. As a result, a positively joined support can be made which is at least substantially perpendicular to a force flow in the strut in the case of a crash.

A strut flange of the molded part can be angled in an embodiment against a following part of the molded part, in a further development by at least about 45°, preferably by at least about 80°. As a result, the connection to the strut can be advantageously improved in an embodiment and/or a desired deformation characteristic made available.

The strut can be connected to the lateral region of the cross member and before, at the same time or subsequently to the crash box and/or the side member. As a result, the assembly, and in particular a pre and/or final assembly can be improved in an embodiment.

Connecting the strut to the lateral region, the crash box and/or the side member can take place or be performed before connecting the crash box to the cross member and/or the side member, at the same time as making the connection or after making the connection. As a result, the assembly, in particular a pre and/or final assembly can be improved in an embodiment.

In an embodiment, the molded part may be releasably connected to the strut in a non-positively joined or a positively joined manner, preferably by screwing and/or plugging. In addition or alternatively, the molded part is releasably connected in an embodiment with the crash box and/or the side member in a non-positively joined and/or positively joined manner, preferably by screwing and/or plugging. Equally, the molded part may be permanently connected in a non-positively joined and/or positively joined manner to the strut, the crash box and/or the side member, preferably by plugging and/or welding, soldering, bonding or riveting.

Through a releasable connection the assembly and disassembly can be improved in an embodiment. Through a permanent connection, the stability of the connection can be improved in an embodiment. By combining a releasable connection of the molded part to the strut on the one hand and a permanent connection of the molded part to the crash box and/or the side member on the other hand or through a combination of a releasable connection of the molded part to the crash box and/or the side member on the one hand and a permanent connection of the molded part to the crash box on the other hand, both advantages can act together and/or assembly tolerances be offset.

The molded part which is connected to the strut may be connected to the crash box. Additionally or alternatively it may also be connected to the side member in particular directly or indirectly. As a result, the force discharge of the strut can be improved and/or a desired loading and/or deformation characteristic of strut, molded part, crash box and/or side member can be made available in an embodiment.

Thus, in an embodiment, the molded part may include a marginal flange, which supports itself in a positively joined manner in longitudinal direction of the side member on the side member, in particular an open or closed front end of the side member, in particular an anchor plate of the side member, which at least substantially extends perpendicularly to its longitudinal direction. Additionally or alternatively, the molded part may include a slide-in region which is pot-shaped or open on one end, which may be slid onto the crash box and/or into the side member in particular in a positively joined manner. To this end, the slide-in region in a further development has an inner contour which—at least substantially—is complementary to an outer contour of the crash box, and/or an outer contour which—at least substantially—is complementary to an inner contour of the side member.

In an embodiment, the molded part is cast and/or formed, in particular bent, preferentially deep-drawn and/or folded. As a result, the connection and/or marginal flange and/or slide-in region explained above may be formed. In an embodiment, the molded part is produced from a material other than the side member and/or the crash box, in particular from a material with a lower compression and/or bending stiffness and/or from a steel and/or in particular fiber-reinforced plastic material.

According to an aspect of the present disclosure, the molded part and the crash box may be jointly or together connected to the side member. In other words the molded part and the crash box may be simultaneously connected to the side member. As a result, the assembly and disassembly effort in an embodiment can be reduced, the connection improved and/or weight saved.

In an embodiment, molded part and crash box may be jointly connected to the side member by the same connecting arrangement, in particular releasably, and preferably by one or multiple screws, which engage through bores in molded part, crash box and side member that are in alignment with one another or permanently, and preferably through one or multiple rivets, which engage through holes in molded part, crash box and side member that are in alignment with one another. Equally, molded part and crash box may also be connected jointly to the side member in a materially-joined manner, in particular in a joint welding, bonding or soldering operation.

BRIEF DESCRIPTION OF THE DRAWINGS

The present disclosure will hereinafter be described in conjunction with the following drawing figures, wherein like numerals denote like elements.

FIG. 1 shows a part of a motor vehicle structure of a passenger car according to an embodiment of the present disclosure in a top view in vehicle vertical direction;

FIG. 2 shows a part of a motor vehicle structure of a passenger car according to a further embodiment of the present disclosure in a representation corresponding to FIG. 1;

DETAILED DESCRIPTION

Figure 3:
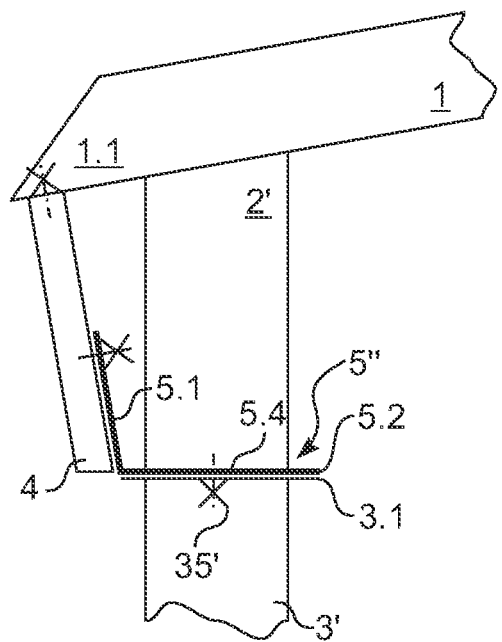
FIG. 3 shows a part of a motor vehicle structure of a passenger car according to a further embodiment of the present disclosure in a representation corresponding to FIG. 1.

The following detailed description is merely exemplary in nature and is not intended to limit the present disclosure or the application and uses of the present disclosure. Furthermore, there is no intention to be bound by any theory presented in the preceding background or the following detailed description.

FIG. 1 shows a part of a motor vehicle structure of a passenger car according to an embodiment of the present disclosure in a top view in vehicle vertical direction. The motor vehicle structure is, at least substantially, symmetrical to a vehicle longitudinal axis (vertical in FIG. 1), so that in the following only the part shown in FIG. 1 is discussed and reference hereto is made to the part located opposite which in this regard is constructed symmetrically and not shown.

In the part shown in FIG. 1 a crash box 2 is connected in a manner which is not shown in more detail to a bumper cross member 1. The crash box 2 is plugged into a side member 3 and connected to the latter by screws 35. The cross member has a lateral region 1.1, which in vehicle transverse direction (horizontal in FIG. 1) protrudes over the crash box 2 to the outside. A strut 4 with an annular cross section is screwed to this lateral region 1.1.

The strut 4 in the embodiment of FIG. 1 has a straight longitudinal axis (dash-dotted in FIG. 1), which with a longitudinal axis of the adjacent crash box 2, with a longitudinal axis of the adjacent side member 3 aligned therewith and with a vehicle longitudinal axis that is parallel thereto, includes an angle α of approximately 35°. The strut 4 is connected to a molded part 5, which in turn is connected to the crash box 2 and the side member 3. For connecting to the strut 4, the molded part 5 includes a strut flange 5.1, which is connected to a long side of the strut 4 by means of screws 45. The strut flange 5.1 of the molded part 5 is angled against a following part of the molded part in the form of a marginal flange 5.2 by approximately 55°.

The marginal flange 5.2 supports itself on the open face end of the side member 3 in its longitudinal direction in a positively joined manner. The marginal flange 5.2 merges into a pot-like or recessed slide-in region 5.3, which is slid onto the crash box in a positively joined manner and slid into the side member 3 and to this end has an inner contour which is complementary to an outer contour of the crash box 2 and has an outer contour, which is complementary to an inner contour of the side member 3. The molded part 5 and the crash box 2 may be connected jointly to the side member 3 through the same connecting means arrangement with multiple screws 35, which engage through bores in molded part 5, crash box 2 and side member 3 that are in alignment with one another.

Through the molded part 5, an assembly and disassembly of the strut 4 is simplified, which is connected with the screws 35 to the crash box 2 and jointly with the crash box 2 to the side member 3. In addition, the connection of the strut 4 to the crash box 2 and the side member 3 is also improved, in particular fixing and supporting thereon. Further additionally, a desired deformation characteristic in the case of a crash is made available, in particular through the angled strut flange 5.1 on the one hand and the positively joined sliding-on or sliding-in of the slide-in region 5.3 on the other hand.

The molded part 5 in the embodiment of FIG. 1 is produced as a stamped-punched part from a steel material.

FIG. 2 shows a part of a motor vehicle structure of a passenger car according to a further embodiment of the present disclosure in a representation corresponding to FIG. 1. Features corresponding to one another are marked by identical reference numbers, if applicable distinguished by an apostrophe ('), so that in the following only the differences are discussed and otherwise reference is made to the description of the other embodiments.

In the embodiment of FIG. 2, the strut flange 5.1' of the molded part 5' and the long side of the strut 4' are permanently connected to one another in a materially-joined manner by means of a weld seam 45' instead of the screw 45.

The strut 4' of the embodiment of FIG. 2 has two portions (top, bottom in FIG. 2) which are angled against one another, wherein the in FIG. 2 lower portion is parallel to the longitudinal axis of the adjacent crash box 2, the longitudinal axis of the adjacent side member 3 and the vehicle longitudinal axis. Accordingly, the strut flange 5.1' is angled against the marginal flange 5.2 by 90°. In FIG. 2, the upper portion of the strut 4' by contrast includes, as in the embodiment of FIG. 1, the angle α of approximately 35° with the longitudinal axis of the crash box 2, the longitudinal axis of the side member 3 and the vehicle longitudinal axis.

FIG. 3 shows a part of a motor vehicle structure of a passenger car according to a further embodiment of the present disclosure in a representation corresponding to FIG. 1, 2. Features corresponding to one another are marked by identical reference characters, if applicable distinguished by one or two apostrophes (';"), so that in the following only the differences are discussed and otherwise reference is made to the description of the other embodiments.

In the embodiment of FIG. 3, the closed face end of the side member 3' includes a so-called anchor plate 3.1. Accordingly, the molded part 5" has a closed flange 5.4 in this embodiment instead of the recessed or pot-like slid-in region 5.3, against which the strut flange 5.1 is angled in the manner explained above.

In the embodiment of FIG. 3, the flange 5.4 of the molded part will be or is connected together with the crash box 2' jointly to the anchor plate 3.1 of the side member 3' by screws 35', which engage through bores in the molded part 5", crash box 2' and side member 3' which are in alignment with one another.

Figure 4:
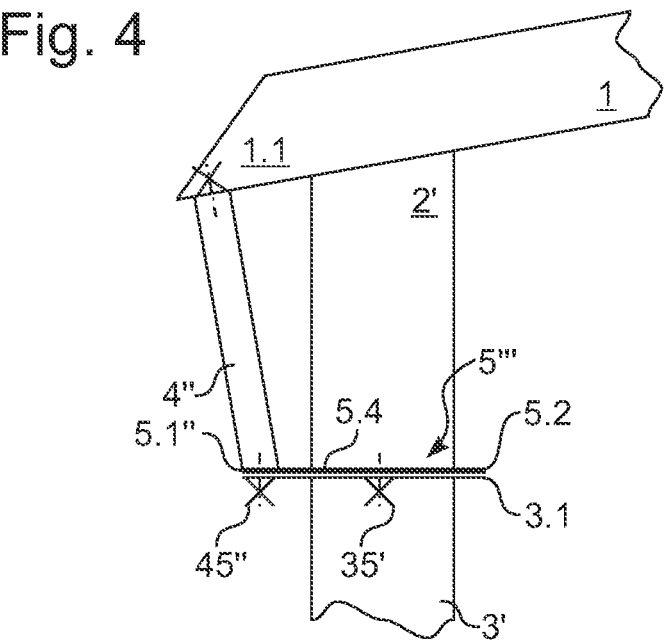
FIG. 4 shows a part of a motor vehicle structure of a passenger car according to a further embodiment of the present disclosure in a representation corresponding to FIG. 1.

FIG. 4 shows a part of a motor vehicle structure of a passenger car according to a further embodiment of the present disclosure in a representation corresponding to FIGS. 1-3. Features corresponding to one another are marked through identical reference numbers, if applicable distinguished by one or two apostrophes (';"), so that in the following only the differences are discussed and otherwise reference is made to the descriptions of the other embodiments. In the embodiment of FIG. 4, the strut flange 5.1" of the molded part 5''' is connected to a face end of the strut 4" and accordingly not angled against the flange 5.4.

Although in the preceding description exemplary embodiments were explained it is pointed out that a multitude of modifications is possible.

In particular, in place of one or multiple of the screw or welded connections shown other connections can also be provided in each case, in particular welded, screwed, riveted or bonded connections. In addition, the face-end support of the strut 4" in particular can be combined with a slide-in region 5.3 of the molded part according to the embodiment of FIG. 4, as it was explained with reference to FIG. 1, 2. Equally, instead of the straight, a strut 4 which is angled and/or curved one or multiple times can also be provided in the embodiments of FIG. 1, 3 or 4, as it was exemplarily explained with reference to FIG. 2.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A motor vehicle structure comprising:
   a cross member;
   at least one side member connected to said cross member with a crash box;
   at least one strut supporting a lateral region of the cross member, and
   a molded part connected to the strut, and connected to at least one of the crash box and the side member, the molded part having a strut flange extending along the crash box towards the cross member and connected to a long side of the strut, wherein an included angle between the strut flange and a longitudinal axis of the crash box is not greater than 55°.

2. The motor vehicle structure according to claim 1 wherein the molded part is releasably connected to at least one of the strut, the crash box and the side member.

3. The motor vehicle structure according to claim 1 wherein the molded part is permanently connected to at least one of the strut, the crash box and the side member.

4. The motor vehicle structure according to claim 1, wherein the molded part comprises an angled strut flange connected to at least one of a long side of the strut and a face end of the strut.

5. The motor vehicle structure according to claim 1 wherein the molded part has a marginal flange supporting the molded part on the side member in a longitudinal direction in a positively joined manner.

6. The motor vehicle structure according to claim 1 wherein the molded part has a slide-in region configured to slide onto the crash box in a positively joined manner.

7. The motor vehicle structure according to claim 1 wherein the molded part has a slide-in region configured to slide into the side member in a positively joined manner.

8. The motor vehicle structure according to claim 1, wherein in longitudinal axis of the strut defines an angle with at least one of a longitudinal axis of the crash box and a longitudinal axis of the side member, wherein the angle is not greater than 45°.

9. The motor vehicle structure according to claim 1, wherein the molded part and the crash box are jointly connected to the side member.

10. A method for fabricating a motor vehicle structure comprising:
   connecting at least one crash box to a cross member and a side member;
   connecting a molded part to at least one of the crash box and the side member; and
   connecting a long side of at least one strut to the cross member and a strut flange extending from the molded part along the crash box towards the cross member for supporting a lateral region of the cross member, wherein an included angle between the strut flange and a longitudinal axis of the crash box is not greater than 55°.

11. The method according to claim 10, further comprising releasably connecting the molded part to at least one of the smut, the crash box and the side member.

12. The method according to claim 11, further comprising permanently connecting the molded part to at least one of the strut, the crash box and the side member.

13. The method according to claim 11, further comprising connecting an angled strut flange on the molded part to a long side of the strut.

14. The method according to claim 11, further comprising connecting an angled strut flange on the molded part to a face end of the strut.

15. The method according to claim 11, further comprising sliding a slide-in region of the molded part onto the crash box in a positively joined manner.

16. The method according to claim 11, further comprising sliding a slide-in region of the molded part into the side member in a positively joined manner.

17. The method according to claim 11, further comprising jointly connecting the molded part and the crash box to the side member.

18. A motor vehicle comprising a vehicle structure fabricated according to the method of claim 11.

* * * * *